United States Patent
Lee et al.

(10) Patent No.: US 8,543,864 B2
(45) Date of Patent: Sep. 24, 2013

(54) APPARATUS AND METHOD OF PERFORMING ERROR RECOVERING PROCESS IN ASYMMETRIC CLUSTERING FILE SYSTEM

(75) Inventors: Sang-Min Lee, Daejeon (KR); Young-Kyun Kim, Daejeon (KR); Han Namgoong, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 347 days.

(21) Appl. No.: 12/971,167

(22) Filed: Dec. 17, 2010

(65) Prior Publication Data

US 2011/0154100 A1   Jun. 23, 2011

(30) Foreign Application Priority Data

Dec. 18, 2009 (KR) .................. 10-2009-0127531
Mar. 30, 2010 (KR) .................. 10-2010-0028464

(51) Int. Cl.
*G06F 11/00* (2006.01)

(52) U.S. Cl.
USPC ........................................ 714/6.22

(58) Field of Classification Search
USPC ................. 714/4.12, 4.3, 6.22, 6.24
See application file for complete search history.

(56) References Cited

U.S. PATENT DOCUMENTS

| | | | | |
|---|---|---|---|---|
| 6,862,692 | B2 * | 3/2005 | Ulrich et al. | 714/6.12 |
| 7,415,488 | B1 * | 8/2008 | Muth et al. | 707/648 |
| 7,418,620 | B1 * | 8/2008 | Tormasov et al. | 714/6.24 |
| 7,577,866 | B1 * | 8/2009 | Fan et al. | 714/6.24 |
| 7,681,072 | B1 * | 3/2010 | Gibson et al. | 714/6.22 |
| 7,805,412 | B1 * | 9/2010 | Gibson et al. | 707/690 |
| 8,086,911 | B1 * | 12/2011 | Taylor | 714/54 |
| 8,099,623 | B1 * | 1/2012 | Li et al. | 714/6.22 |
| 2005/0193239 | A1 * | 9/2005 | Shackelford | 714/7 |
| 2006/0161805 | A1 * | 7/2006 | Tseng et al. | 714/6 |

FOREIGN PATENT DOCUMENTS

KR   10-2008-0050276   6/2008

* cited by examiner

*Primary Examiner* — Marc Duncan
(74) *Attorney, Agent, or Firm* — Staas & Halsey LLP

(57) ABSTRACT

The present invention relates to an apparatus and method of performing an error recovery process in an asymmetric clustering file system that has higher efficiency in data recovery when a data server in an asymmetric clustering file system fails than a method of processing the data recovery in the metadata server. The present invention includes receiving a chunk list requiring recovery by a data server included in the other data server groups than a data server group including a failed data server among a plurality of data server groups, requesting chunk data necessary for recovering an erroneous chunk from a data server in the other data server groups to the other data servers than the failed data server in the data server group, and recovering the erroneous chunk based on the chunk data by the data server in the other data server group.

20 Claims, 9 Drawing Sheets

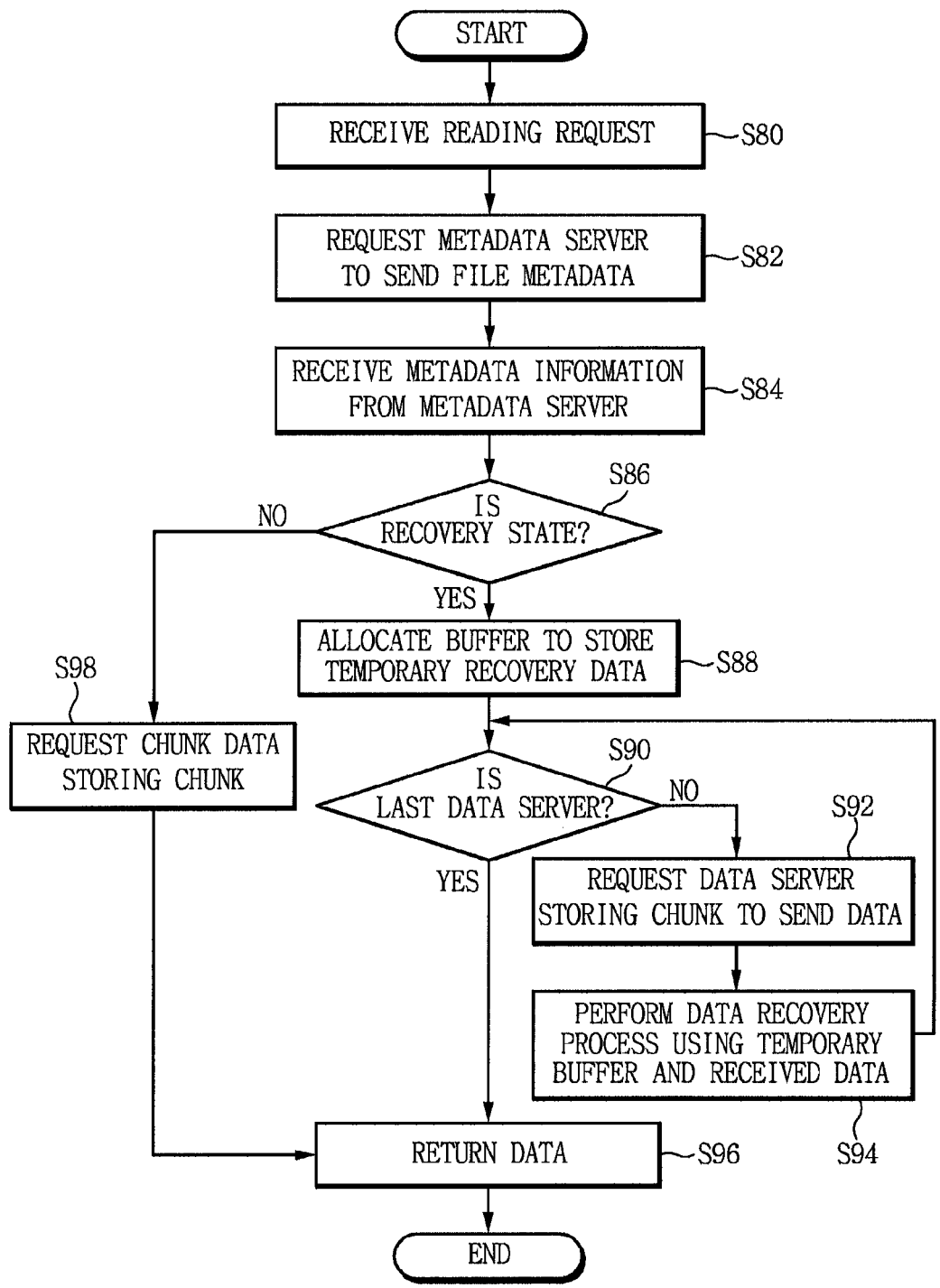

APPARATUS AND METHOD OF PERFORMING ERROR RECOVERING PROCESS IN ASYMMETRIC CLUSTERING FILE SYSTEM

CROSS REFERENCE TO RELATED APPLICATIONS

This application claims priority to Korean Patent Application No. 10-2009-0127531 filed on Dec. 18, 2009 and Korean Patent Application No. 10-2010-0028464 filed on Mar. 30, 2010, the entire contents of which are herein incorporated by reference.

BACKGROUND OF THE INVENTION

1. Field of the Invention

The present invention relates to an apparatus and method of performing an error recovery process in an asymmetric clustering file system, and more particularly, to an apparatus and method of distributively processing the recovery of a data error due to failure of a data server in an asymmetric clustering file system.

2. Description of the Related Art

In general, an asymmetric clustering file system includes a metadata server managing metadata of a file, a plurality of data servers managing data of a file, and a plurality of clients storing or searching a file.

The metadata server, the plurality of data servers, and the plurality of clients are connected to and communicate with one another over a local network.

The plurality of data servers provide a single mass storage space using a virtualization technology. The storage space may be freely managed by adding and deleting the data servers or volumes included in the data servers.

Such a system managing a plurality of data servers considers a failure rate that is proportional to the number of servers managed by the system. Accordingly, a system managing a plurality of data servers utilizes a method of providing parity for recovery while distributing data, such as RAID (Redundant Array of Inexpensive Disks) level-5, or a mirroring technology that preliminarily provides a copy of data. The mirroring technology suffers from a low efficiency due to duplicated storage. Accordingly, a data distributive storage structure using parity is preferred in the case of requiring fault tolerance.

The data distributive storage structure using parity may recover data stored in a storage device having a single error among data storage devices by using parity. The data is recovered by performing an error correction scheme (for example, exclusive-OR) on the other data constituting parity and the parity. For this purpose, the single data recovery process should be accompanied with a reading process on a number of data and parity.

In most of the known technologies, a metadata server having detected an error in a storage device recovers data stored in the storage device.

SUMMARY OF THE INVENTION

The present invention has been made in an effort to provide an apparatus and method of performing an error recovery process in an asymmetric clustering file system that has higher efficiency in data recovery when a data server in an asymmetric clustering file system fails than a method of processing the data recovery in the metadata server.

An embodiment of the present invention distributively processes data recovery due to failure of a single data server in a structure where an asymmetric clustering file system distributively stores data and parity in a plurality of data servers.

An exemplary embodiment of the present invention provides a method of performing an error recovery process in an asymmetric clustering file system, includes: receiving a chunk list requiring recovery by a data server included in other data server groups than a data server group including a failed data server among a plurality of data server groups; requesting chunk data necessary for recovering an erroneous chunk from the data server in the other data server groups to the other data servers excepting the failed data server in the data server groups; and recovering the erroneous chunk based on the chunk data by the data server in the other data server groups.

Each of the plurality of data server groups may include a plurality of data servers, whose number is equal to a summed value of the number of file data divided in the unit of chunk for a file stored from a client and the number of parities for error recovery for the file data.

The chunk list may include a chunk identifier requiring recovery, a chunk identifier in which recovery data is stored, and a chunk information list necessary for recovery, for each of one or more disk identifier.

The chunk identifier necessary for recovery may be identification information of a chunk selected among chunks stored in the failed data server.

The chunk identifier in which the recovery data is stored may be identification information of a chunk that is to be newly stored after the erroneous chunk is recovered.

The chunk information list necessary for recovery may be a list of chunk information on data and parity necessary for recovering the erroneous chunk.

The chunk information may include an IP address of a data server storing a chunk, a disk identifier, and chunk identifier information.

The method may further comprise after the recovering, transmitting a recovery complete message from the data server in the other data server groups to a metadata server.

The method may further comprise storing recovery data generated by recovering the erroneous chunk in the chunk list by the data server in the other data server groups.

The method may further comprise upon receiving a writing request from a client, performing a process corresponding to the writing request, by the data server in the other data server group.

The performing the writing request process may include confirming whether a corresponding chunk exists in the chunk list based on the writing request; and writing and storing data to the corresponding chunk if the corresponding chunk does not exist in the chunk list.

The method may further comprise after the storing, notifying the completion of recovery to the metadata server.

The performing the writing request process may include, if the corresponding chunk exist in the chunk list, while the recovery of the corresponding chunk is in progress, cancelling the recovery and deleting the corresponding chunk information from the chunk list; and storing data according to the writing request to a corresponding chunk.

The performing the writing request process may further include, if the corresponding chunk exist in the chunk list, and the recovery of the corresponding chunk is not started, deleting the corresponding chunk information from the chunk list; and storing data according to the writing request to a corresponding chunk.

Another embodiment of the present invention provides an apparatus of performing an erroneous recovering process in an asymmetric clustering file system, includes: a receiving unit that receives a chunk list requiring recovery from a metadata server; a recovering unit that recovers an erroneous chunk based on chunk data necessary for recovering the erroneous chunk; and a controller that requests the chunk data to the other data servers excepting a failed data server in a data server groups and transmits the received chunk data to the recovering unit.

The chunk list may include a chunk identifier requiring recovery, a chunk identifier in which recovery data is stored, and a chunk information list necessary for recovery, for each of one or more disk identifier.

The chunk identifier necessary for recovery may be identification information of a chunk selected among chunks stored in the failed data server.

The chunk identifier in which the recovery data is stored may be identification information of a chunk that is to be newly stored after the erroneous chunk is recovered.

The chunk information list necessary for recovery may be a list of chunk information on data and parity necessary for recovering the erroneous chunk.

The controller may transmit a recovery complete message to the metadata server when the recovery is complete by the recovering unit.

According to the embodiments of the present invention, it is possible to allow for more efficient and faster recovery than a method of performing an error recovery process exclusively by a single metadata server since a plurality of data servers may distributively recover erroneous data.

BRIEF DESCRIPTION OF THE DRAWINGS

FIG. 9 is a flowchart illustrating a reading process by a client in an asymmetric clustering file system according to an exemplary embodiment of the present invention.

DETAILED DESCRIPTION OF THE PREFERRED EMBODIMENTS

Figure 1:
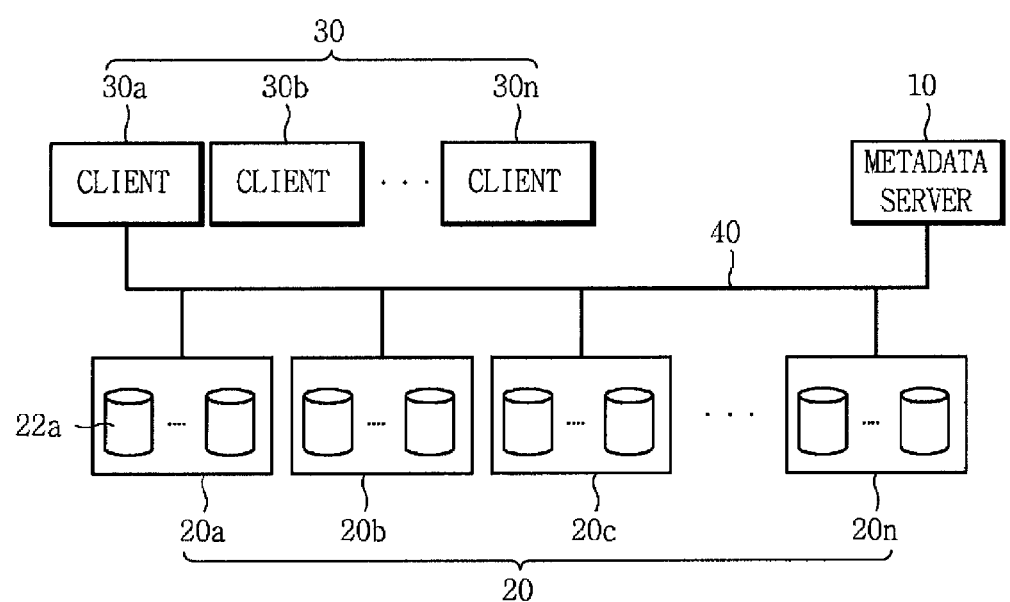
FIG. 1 is a view illustrating a structure of an asymmetric clustering file system according to an exemplary embodiment of the present invention.

The accompanying drawings illustrating embodiments of the present invention and contents described in the accompanying drawings should be referenced in order to fully appreciate operational advantages of the present invention and objects achieved by the embodiments of the present invention.

Hereinafter, the present invention will be described in detail by describing preferred embodiments of the present invention with reference to the accompanying drawings. Like elements refer to like reference numerals shown in the drawings.

FIG. 1 is a view illustrating a structure of an asymmetric clustering file system according to an exemplary embodiment of the present invention.

A metadata server 10 manages metadata of a file.

A plurality of data servers 20a to 20n ("20") manage data of a file. Each of the data servers includes one or more disk storage device 22a. The size of a storage space of each data server is determined depending on the number of included disk storage devices.

Clients 30a to 30n ("30") have access to a file.

The metadata server 10, the plurality of data servers 20a to 20n ("20"), and the clients 30a to 30n ("30") are connected to and communicate with one another over a network 40, such as Ethernet.

According to the exemplary embodiment present invention, a file stored from the clients 30a to 30n are divided into predetermined units called "chunks", and the chunks are previously stored in the different data servers 20a to 20n, respectively, and parities for recovering an error occurring in one of the data servers are previously stored in the different data servers 20a to 20n. Detailed description will be given below with reference to FIG. 2.

Figure 2:
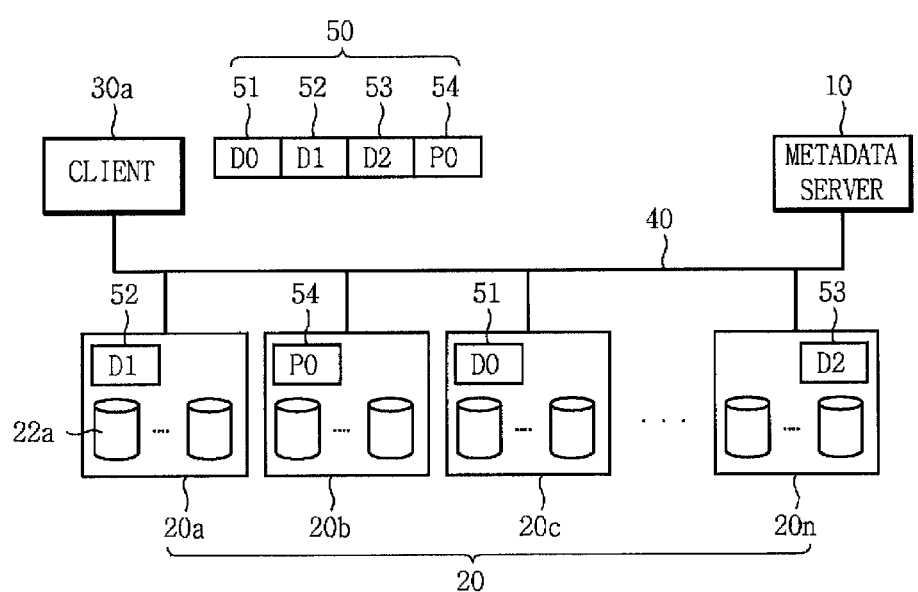
FIG. 2 is a view illustrating a method of distributively storing data and parities in an asymmetric clustering file system according to an exemplary embodiment of the present invention.

FIG. 2 is a view illustrating a method of distributively storing data and parities in an asymmetric clustering file system according to an exemplary embodiment of the present invention.

The client 30a divides a file A 50 into predetermined units (for example, chunks). Here, the divided size may be predetermined or determined by a user as, for example, a value obtained by dividing the size of the file A 50 by the number of data servers that is to store the file A 50.

As such, the client 30a generates one parity 54 for every certain number of data 51, 52, and 53 that are generated by dividing the file A 50. The number of data chunks constituting the parity 54 may be defined by a user. The data servers 20a, 20b, 20c, and 20n storing the data 51, 52, and 54, and the parity 54 are selected by the metadata server 10 considering the utilization of the storage space in each data server. The metadata server 10 notifies the selected result to the client 30a.

The data 51, the data 52, the data 53, and the parity 54 are stored in the data servers 20c, 20a, 20n, and 20b, respectively. In FIG. 2, it is assumed that among n data servers (n≥5), four data servers 20a, 20b, 20c, and 20n configure a data server group. Under this assumption, when any one data server (for example, data server 20a) included in a data server group fails, a data server included in another data server groups provided separately from the data servers 20a, 20b, 20c, and 20n (that is, a normal data server selected by the metadata server 10) performs a recovery process.

Figure 3:
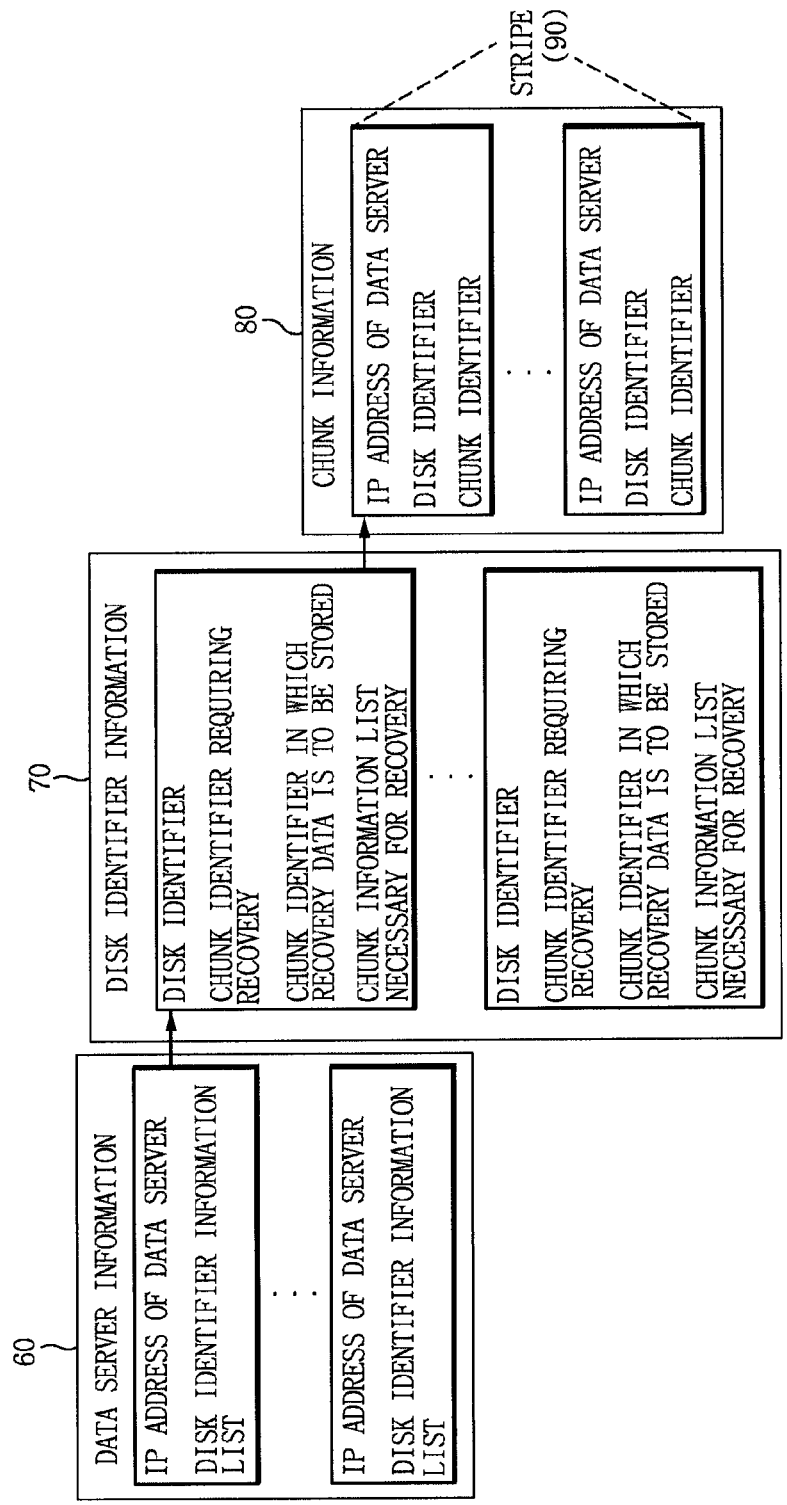
FIG. 3 is a view illustrating a recovery information structure configured by a metadata server for performing a data recovery distributive process in an asymmetric clustering file system according to an exemplary embodiment of the present invention.

FIG. 3 is a view illustrating a recovery information structure configured by a metadata server for performing a data recovery distributive process in an asymmetric clustering file system according to an exemplary embodiment of the present invention.

The metadata server 10 detects a failure of a data server included in each data server group. When detecting a failure of a data server, the metadata server 10 inspects the asymmetric clustering file system to configure a recovery information structure. The metadata server 10 transmits the configured recovery information structure to a data server included in other data server groups excepting the data server group including the failed data server.

The recovery information structure includes data server information 60 containing a data server IP address and a disk identifier information list for each data server. Also, the disk identifier information list includes disk identifier information 70 that contains a chunk identifier requiring recovery for each disk identifier, a chunk identifier in which recovery data is to be stored, and a chunk information list necessary for recovery. The chunk information list necessary for recovery includes chunk information 80 that contains an IP address of a data server storing a chunk, a disk identifier, and a chunk identifier.

Here, the chunk identifier requiring recovery is identification information of a chunk selected among chunks stored in the failed server. The chunk identifier in which recovery data is to be stored is identification information of a chunk that is to be stored after the erroneous chunk is recovered. The chunk information list necessary for recovery is a list of data and parity chunk information necessary for recovering the erroneous chunk. Data chunks provided to calculate one parity chunk and parity are referred to as a "stripe 90".

Figure 4:
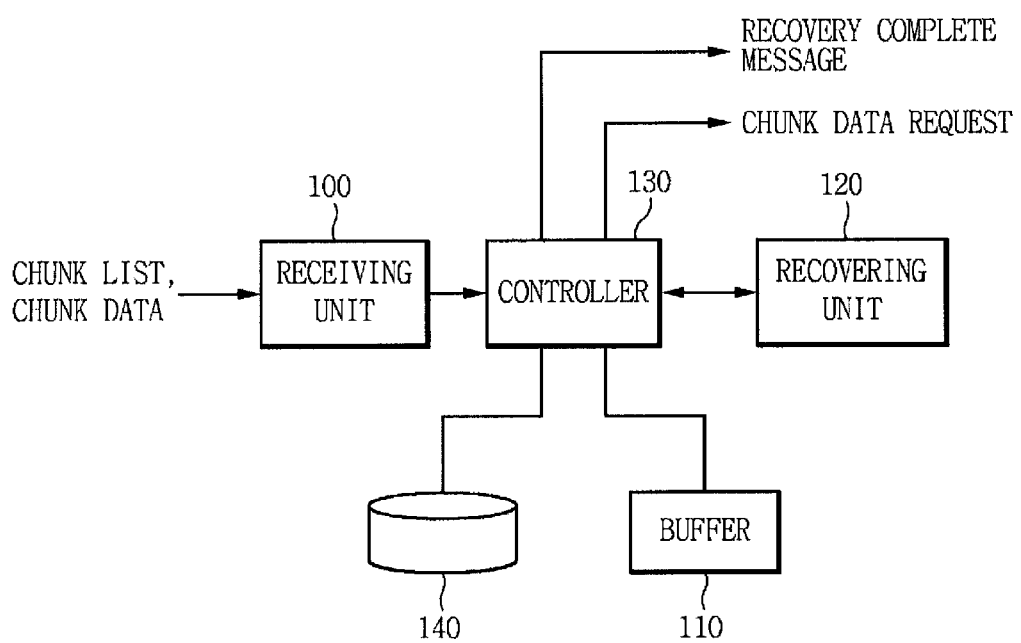
FIG. 4 is a block diagram illustrating an inner configuration of a data server in an asymmetric clustering file system according to an exemplary embodiment of the present invention.

FIG. 4 is a block diagram illustrating an inner configuration of a data server in an asymmetric clustering file system according to an exemplary embodiment of the present invention.

A data server includes a receiving unit 100, a buffer 110, a recovering unit 120, a controller 130, and a storing unit 140. Here, the data server may be one of the data servers 20a to 20n shown in FIG. 1. However, a failed data server may not receive a chunk list requiring recovery from the metadata server 10.

The receiving unit 100 receives a chunk list requiring recovery from the metadata server 10. Here, the received chunk list is a list of the disk identifier information 70. The disk identifier information 70 has been described with reference to FIG. 3.

The buffer 110 stores recovery data generated by recovering the erroneous chunk. That is, the buffer 110 temporarily stores recovery data generated by recovering the erroneous chunk. Although a single buffer 110 has been shown in FIG. 4, a plurality of buffers may also be provided.

The recovering unit 120 recovers the erroneous chunk based on the chunk data necessary to recover the erroneous chunk. Here, the chunk data necessary to recover the erroneous chunk is included in the other data servers excepting the failed data server in the data server groups.

The controller 130 requests the other data servers excepting the failed data server in the data server groups to send chunk data (that is, chunk data necessary to recover the erroneous chunk). The controller 130 transmits the received chunk data to the recovering unit 120 through the receiving unit 100. The controller 130 transmits a recovery complete message to the metadata server 10 after recovery by the recovering unit 120 is complete.

The storing unit 140 stores file data on a per chunk basis. Here, the storing unit 140 may correspond to the disk storage device 22a shown in FIG. 1.

Figure 5:
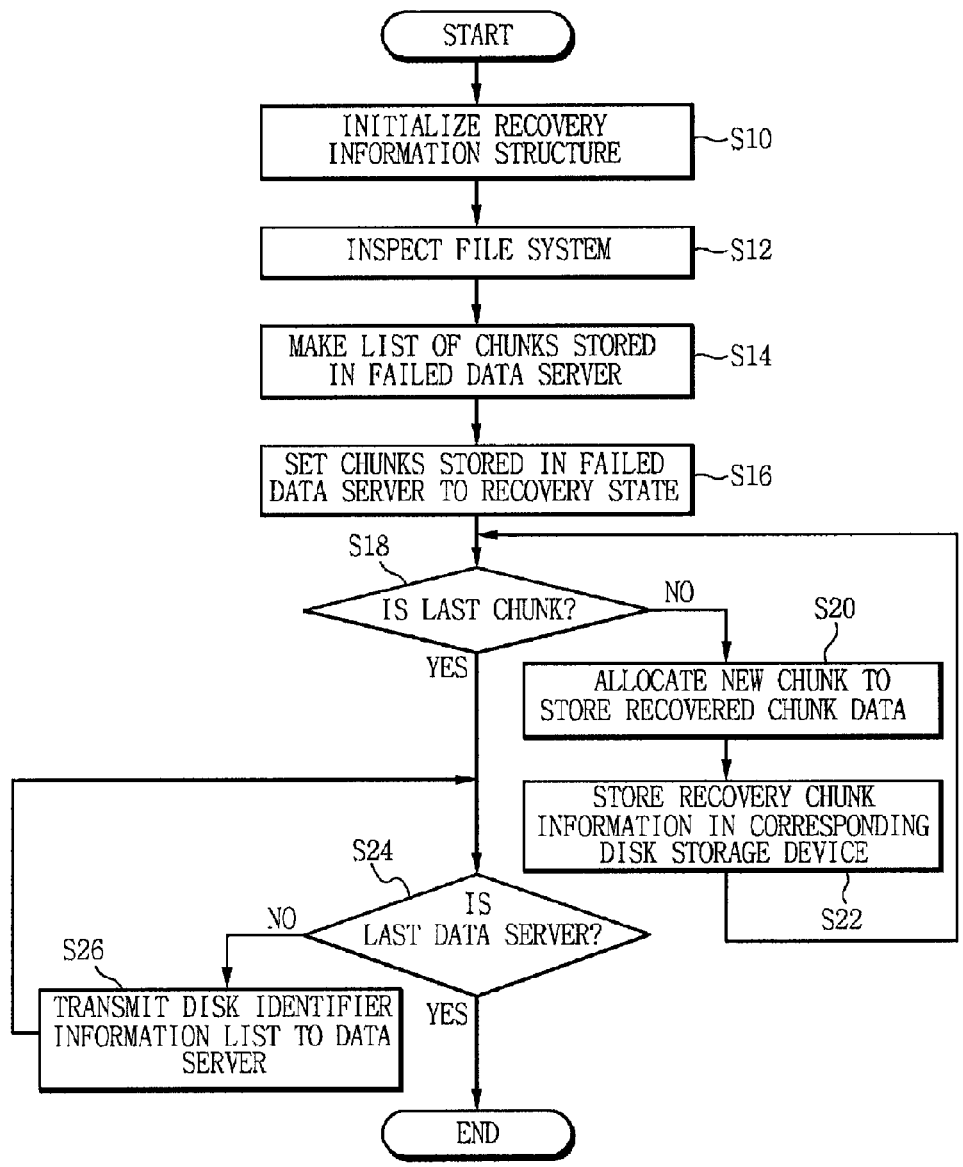
FIG. 5 is a flowchart illustrating a recovery management thread process performed in a metadata server in an asymmetric clustering file system according to an exemplary embodiment of the present invention.

FIG. 5 is a flowchart illustrating a recovery management thread process performed in a metadata server in an asymmetric clustering file system according to an exemplary embodiment of the present invention. That is, FIG. 5 illustrates a flow of a data recovery management thread process performed when the metadata server 10 detects a failure of a data server.

The metadata server 10 first initializes a recovery information structure (preferably, the data server information 60 and the disk identifier information 70 in the form of a list) (S10).

The metadata server 10 inspects the asymmetric clustering file system (S12).

The metadata server 10 makes a list of chunks stored in the failed data server by inspection (S14). Here, it is assumed that one data server ground includes four data servers 20a, 20b, 20c, and 20n, and among the four data servers 20a, 20b, 20c, and 20n, the failed data server is the data server 20a.

The metadata server 10 sets the chunks stored in the failed data server 20a (that is, the erroneous chunks) to a recovery state (S16).

The metadata server 10 stores the whole chunks included in the thusly made chunk list to the initialized recovery information structure (S18). That is, when the chunk identifier that needs to be recovered is selected, the metadata server 10 allocates a new chunk to store the recovered chunk data (S20). Then, the metadata server 10 inspects the chunk information 80 of the remaining data and parity included in the stripe 90 belonging to the selected chunk and stores the chunk information 80 to the recovery information structure (S22). Here, the stored location is an information structure that corresponds to the data server and the disk storage device that generated the newly allocated chunk.

When the above process is complete to be performed on the last chunk, the metadata server 10 transmits the content stored in the disk identifier information 70 of the list of the data server information 60 to the data server that is to perform a recovery process (S26). That is, the metadata server 10 transmits a list of chunks requiring recovery to the data server that will perform a recovery process. Here, the data server that will perform a recovery process is the data server included in other data server groups than the data server group including the failed data server 20a.

Here, when the process of transmitting to the data server that will perform the recovery process (S26) is complete so as to be performed on the content of the last data server, that is, the process (S26) is completely conducted on the whole data servers 20b, 20c, and 20n ("Yes" in step S24), the corresponding thread ends.

Figure 6:
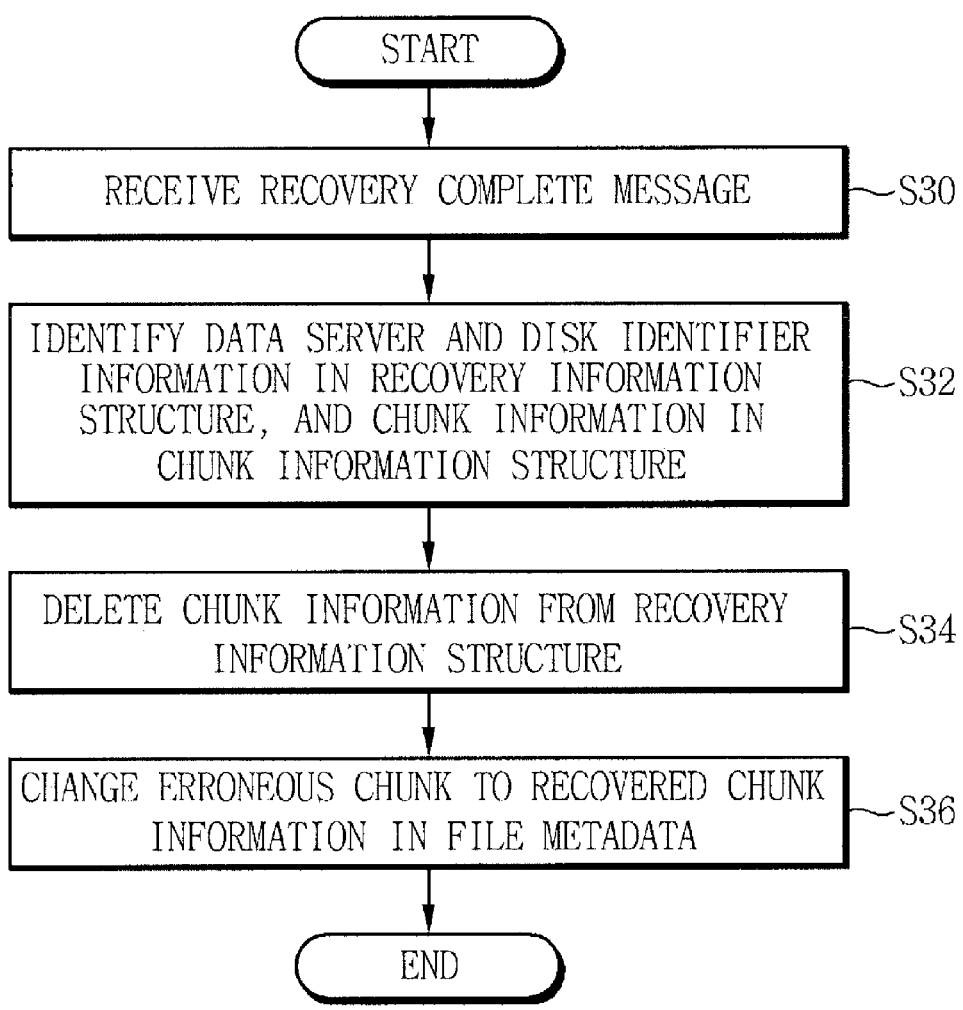
FIG. 6 is a flowchart illustrating a process performed when a recovery complete message is received by a metadata server in an asymmetric clustering file system according to an exemplary embodiment of the present invention.

FIG. 6 is a flowchart illustrating a process performed when a recovery complete message is received by a metadata server in an asymmetric clustering file system according to an exemplary embodiment of the present invention. First, it is assumed that the metadata server 10 includes the recovery information structure processed as shown in FIG. 5.

The metadata server 10 receives a recovery complete message from the data server (that is, the data server that performed the recovery process) (S30).

The metadata server 10 searches the data server information 60 and the disk identifier information 70 using the data server IP address and the disk identifier in the recovery information structure. Thereafter, the metadata server 10 compares the received chunk identifier with a chunk identifier in which the recovered data is to be stored to search corresponding chunk information (S32).

The metadata server 10 deletes the chunk information including information on the erroneous chunk whose recovery was complete in the recovery information structure (S34).

And, the metadata server 10 corrects the erroneous chunk information with newly recovered chunk information in the file metadata (S36).

Figure 7:
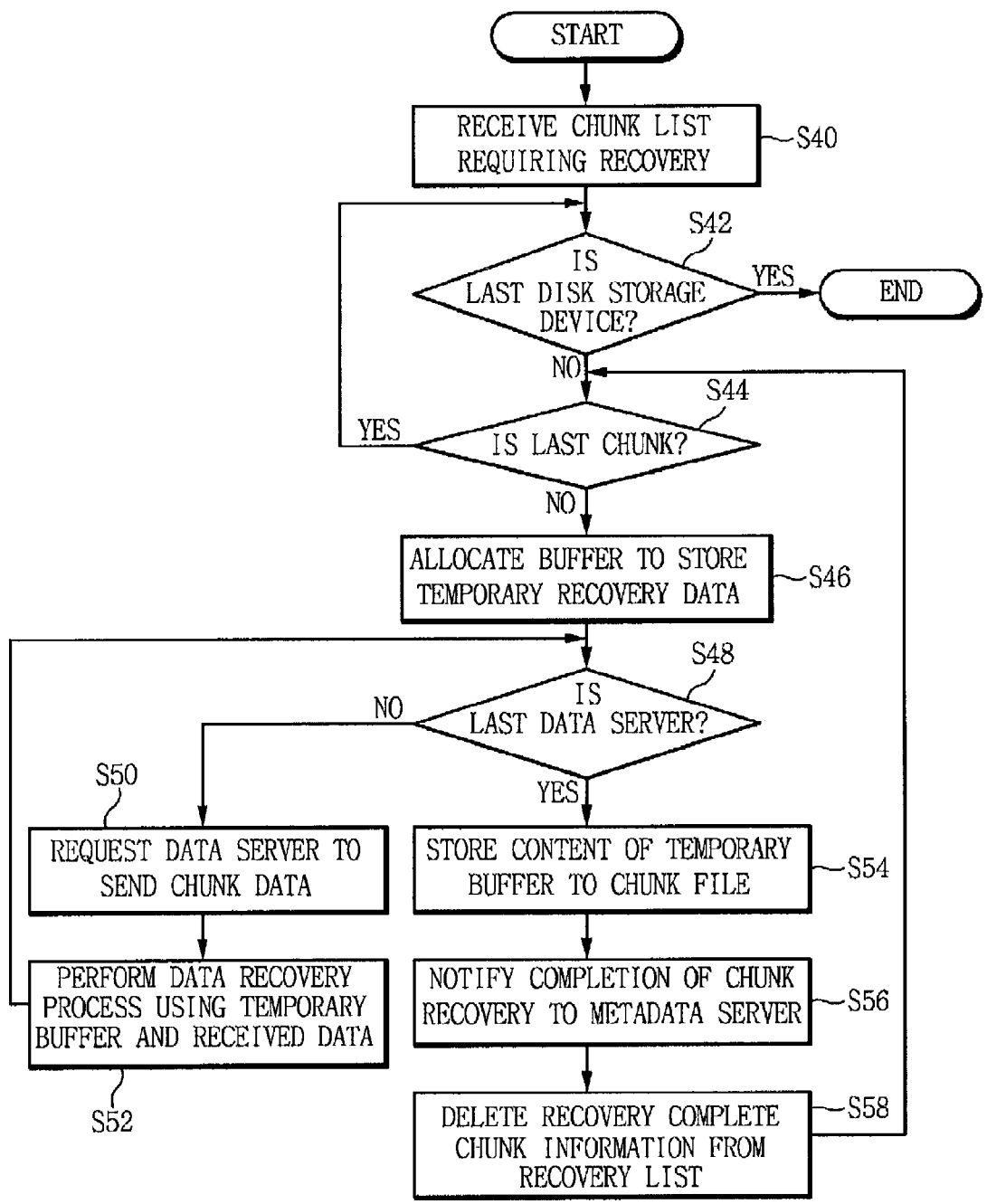
FIG. 7 is a flowchart illustrating a process of recovering an erroneous chunk by a data server in an asymmetric clustering file system according to an exemplary embodiment of the present invention.

FIG. 7 is a flowchart illustrating a process of recovering an erroneous chunk by a data server in an asymmetric clustering file system according to an exemplary embodiment of the present invention.

First of all, a data server that will perform a recovery process receives a list of chunks that need to be recovered from the metadata server 10 (S40). Here, the received chunk list is a list of the disk identifier information 70. Here, the data server that will perform a recovery process is a data server included in other data server groups than the data server group including the failed data server.

The data server that will perform the recovery process on the first disk storage device on the last disk storage device included in the received chunk list, and if the recovery process on the last disk storage device is complete ("Yes" in step S42), then the data server ends the recovery process.

The data server that will perform the recovery conducts a recovery process on the first chunk to the last chunk included in the chunk list containing the content of an erroneous chunk for each disk storage device (S44). In other words, the data server that will perform the recovery process first allocates a buffer that temporarily stores a chunk under recovery (S46). When the buffer is allocated, the data server that will perform the recovery server performs a recovery process, such as the following steps. The data server that will perform the recovery process identifies whether the current data server is the last data server among the data servers storing the chunks necessary to recover the erroneous chunk (S48).

If not, the data server that will perform the recovery process requests the other data servers (for example, the data servers 20b, 20c, and 20n) excepting the failed data server to send the corresponding chunk data (S50).

Thereafter, upon receiving the requested chunk data, the data server that will perform the recovery process conducts an erroneous data recovery process (for example, exclusive-OR) using the content contained in the temporary buffer and the received data (S52). Since the erroneous data recovery process was performed, the data server that will perform the recovery process will be hereinafter referred to as having performed the recovery process.

When the erroneous data recovery process is completely performed up to the last chunk of the last data server (that is, the other data servers 20b, 20c, and 20n excepting the failed data server), the data server that has performed the recovery process stores the recovered data stored in the temporary buffer to a newly allocated chunk file (S54).

Upon the completion of storage, the data server that has performed the recovery process notifies the completion of recovery of the erroneous chunk to the metadata server 10 (S56). That is, the data server that has performed the recovery process sends a recovery complete message to the metadata server 10.

Then, the data server that has performed the recovery process deletes information on the recovered chunk from the chunk list requiring recovery (S58).

Figure 8:
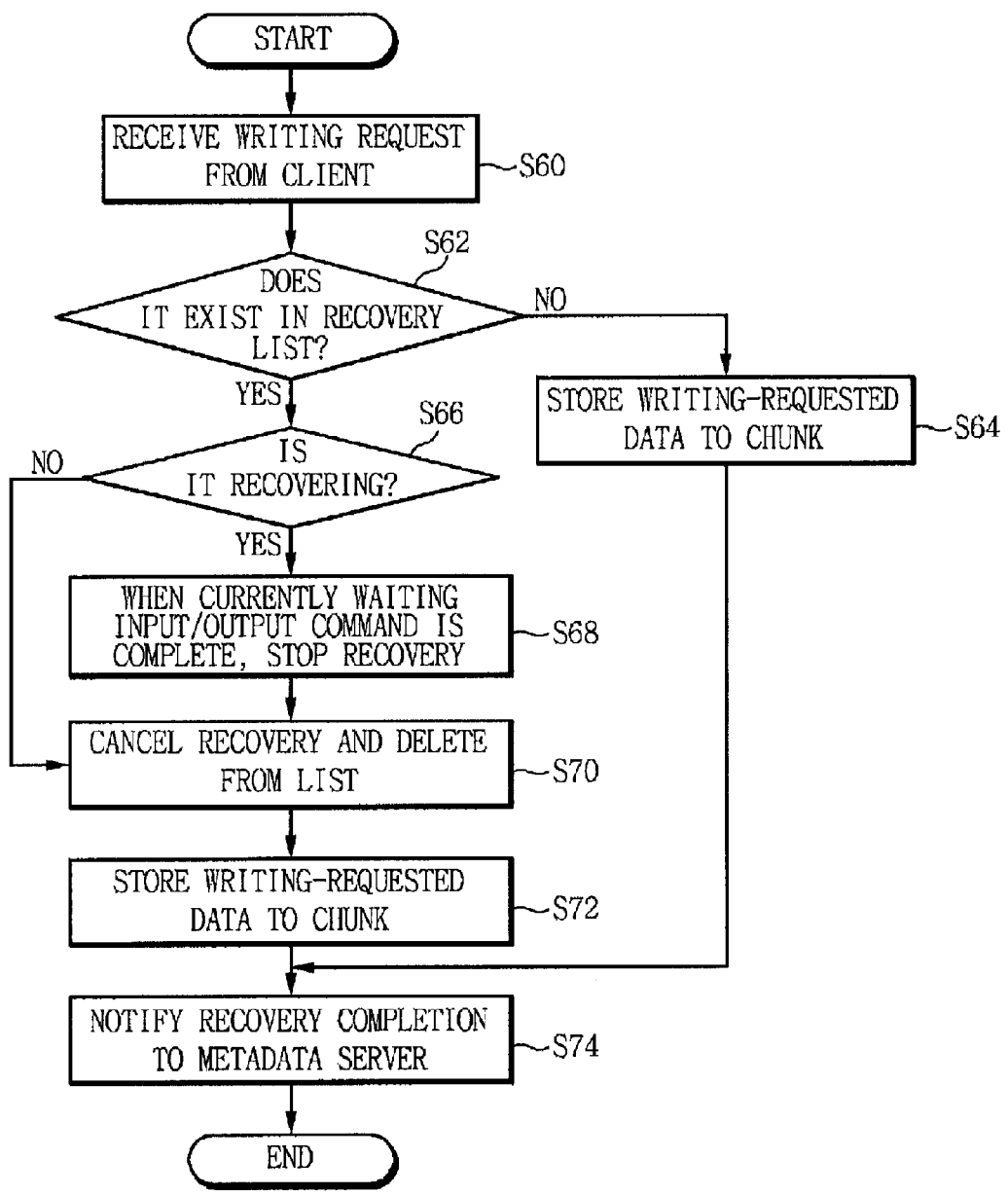
FIG. 8 is a flowchart illustrating a process performed when a writing request is received from a client to a data server in an asymmetric clustering file system according to an exemplary embodiment of the present invention.

FIG. 8 is a flowchart illustrating a process performed when a writing request is received from a client to a data server in an asymmetric clustering file system according to an exemplary embodiment of the present invention.

First of all, a data server that is the main entity of recovery receives a writing request from a client (any one of the clients 30a to 30n) (S60). Here, the data server that is the main entity of recovery is a data server included in other data server groups than the data server group including the failed data server.

Subsequently, the data server that is the main entity of recovery identifies whether the corresponding chunk exists in the list of recovered chunks in process (S62).

If not ("No" in step S62), the data server that is the main entity of recovery considers the corresponding chunk as having been already complete to be recovered, and performs a writing process on the corresponding chunk file (S64).

On the contrary, if any ("Yes" in step S62) and the recovery of the corresponding chunk is currently in progress ("Yes" in step S66), then the data server that is the main entity of recovery stops the recovery process when a currently waiting input/output command is complete (S68). Then, the data server that is the main entity of recovery deletes the corresponding chunk information from the recovery chunk list (S70). Of course, information on a chunk that is still existent in the recovery chunk list but does not start to be recovered is deleted from the recovery chunk list. Subsequently, the data server that is the main entity of recovery stores the writing-requested data to the corresponding chunk (S72).

As such, when the recovery is complete, or the recovery is cancelled and the storage of the writing data is complete, the data server that is the main entity of recovery notifies the completion of recovery of the corresponding chunk to the metadata server 10 (S74). That is, the data server that is the main entity of recovery sends a recovery complete message to the metadata server 10.

FIG. 9 is a flowchart illustrating a reading process by a client in an asymmetric clustering file system according to an exemplary embodiment of the present invention. FIG. 9 illustrates a process in which the client performs a reading process in response to a reading request from an application layer that is an upper layer of the client.

First, a client (any one of the clients 30a to 30n) receives a reading request (S80).

In response to the reading request, the client requests the metadata server 10 to send metadata on the corresponding file (S82).

Thereafter, the client receives the metadata information from the metadata server 10 (S84).

Subsequently, the client identifies whether the state value of the chunk to be currently read is a recovered state based on the received metadata information (S86).

If being the recovered state ("Yes" in step S86), then the client first allocates a temporary buffer to store the recovered data (S88). Here, the number of allocated buffers may be equal to the number of the data servers storing the chunk necessary for recovery. For example, assuming that one data server group includes four data servers and among the four data servers, one data server fails, the remaining three data servers become the data servers that store the chunk necessary for recovery.

If the last data server is not yet allocated a temporary buffer ("No" in step S90), then the client requests even the last data server storing the chunk necessary for recovery to send the corresponding chunk data (S92). Upon receiving the corresponding chunk data, the client performs an erroneous data recovery process using the content of the temporary buffer and the received chunk data (S94).

If the erroneous data recovery process is completely performed on the last data server, the client returns the corresponding data (S96).

Unless being identified as being the recovered state in step S86, the client requests the data server storing the corresponding chunk to send the data (S98), and then conducts the process in step S96.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims. Accordingly, the actual technical protection scope of the present invention must be determined by the spirit of the appended claims.

What is claimed is:

1. A method of performing an error recovery process in an asymmetric clustering file system, comprising:
    dividing a plurality of data servers into a plurality of data server groups, each data server group including at least one data server;
    receiving a chunk list requiring recovery by a one or more data servers included in data server groups other than a data server group including a failed data server among the plurality of data server groups;
    requesting chunk data necessary for recovering an erroneous chunk from the one or more data servers in the data server groups other than the data server group including the failed data server; and
    recovering the erroneous chunk based on the chunk data by the one or more data servers in the other data server groups.

2. The method of claim 1, wherein each of the plurality of data server groups includes a plurality of data servers, whose number is equal to a summed value of the number of file data divided in the unit of chunk for a file stored from a client and the number of parities for error recovery for the file data.

3. The method of claim 1, wherein the chunk list includes a chunk identifier requiring recovery, a chunk identifier in which recovery data is stored, and a chunk information list necessary for recovery, for each of one or more disk identifier.

4. The method of claim 3, wherein the chunk identifier necessary for recovery is identification information of a chunk selected among chunks stored in the failed data server.

5. The method of claim 3, wherein the chunk identifier in which the recovery data is stored is identification information of a chunk that is to be newly stored after the erroneous chunk is recovered.

6. The method of claim 3, wherein the chunk information list necessary for recovery is a list of chunk information on data and parity necessary for recovering the erroneous chunk.

7. The method of claim 6, wherein the chunk information includes an IP address of a data server storing a chunk, a disk identifier, and chunk identifier information.

8. The method of claim 1, further comprising after the recovering, transmitting a recovery complete message from the data server in the other data server groups to a metadata server.

9. The method of claim 1, further comprising storing recovery data generated by recovering the erroneous chunk in the chunk list by the data server in the other data server groups.

10. The method of claim 1, further comprising upon receiving a writing request from a client, performing a process corresponding to the writing request, by the data server in the other data server group.

11. The method of claim 10, wherein the performing the writing request process includes confirming whether a corresponding chunk exists in the chunk list based on the writing request; and writing and storing data to the corresponding chunk if the corresponding chunk does not exist in the chunk list.

12. The method of claim 11, further comprising after the storing, notifying the completion of recovery to the metadata server.

13. The method of claim 11, wherein the performing the writing request process includes,
    if the corresponding chunk exist in the chunk list, and the recovery of the corresponding chunk is in progress, cancelling the recovery and deleting the corresponding chunk information from the chunk list; and
    storing data according to the writing request to a corresponding chunk.

14. The method of claim 11, wherein the performing the writing request process further includes,
    if the corresponding chunk exist in the chunk list, and the recovery of the corresponding chunk is not started, deleting the corresponding chunk information from the chunk list; and
    storing data according to the writing request to a corresponding chunk.

15. An apparatus of performing an erroneous recovery process in an asymmetric clustering file system containing a plurality of data servers divided into a plurality of data server groups, each data server group including at least one data server, comprising:
    a receiving unit that receives a chunk list requiring recovery from a metadata server;
    a recovering unit that recovers an erroneous chunk based on chunk data necessary for recovering the erroneous chunk; and
    a controller that requests the chunk data to one or more data servers data server groups other than a data server group including a failed data and transmits the received chunk data to the recovering unit.

16. The apparatus of claim 15, wherein the chunk list includes a chunk identifier requiring recovery, a chunk identifier in which recovery data is stored, and a chunk information list necessary for recovery, for each of one or more disk identifier.

17. The apparatus of claim 16, wherein the chunk identifier necessary for recovery is identification information of a chunk selected among chunks stored in the failed data server.

18. The apparatus of claim 16, wherein the chunk identifier in which the recovery data is stored is identification information of a chunk that is to be newly stored after the erroneous chunk is recovered.

19. The apparatus of claim 16, wherein the chunk information list necessary for recovery is a list of chunk information on data and parity necessary for recovering the erroneous chunk.

20. The apparatus of claim 15, wherein the controller transmits a recovery complete message to the metadata server when the recovery is complete by the recovering unit.

* * * * *